US008533437B2

(12) United States Patent
Henry et al.

(10) Patent No.: US 8,533,437 B2
(45) Date of Patent: Sep. 10, 2013

(54) GUARANTEED PREFETCH INSTRUCTION

(75) Inventors: G. Glenn Henry, Austin, TX (US);
Colin Eddy, Austin, TX (US); Rodney E. Hooker, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 693 days.

(21) Appl. No.: 12/781,337

(22) Filed: May 17, 2010

(65) Prior Publication Data

US 2010/0306503 A1    Dec. 2, 2010

Related U.S. Application Data

(60) Provisional application No. 61/182,799, filed on Jun. 1, 2009.

(51) Int. Cl.
*G06F 12/00* (2006.01)
*G06F 9/312* (2006.01)

(52) U.S. Cl.
USPC .......................................... 712/220; 712/225

(58) Field of Classification Search
None
See application file for complete search history.

(56) References Cited

U.S. PATENT DOCUMENTS

| 5,796,971 | A  | * | 8/1998 | Emberson | 712/207 |
|---|---|---|---|---|---|
| 6,128,703 | A  | * | 10/2000 | Bourekas et al. | 711/138 |
| 6,470,427 | B1 | * | 10/2002 | Arimilli et al. | 711/137 |
| 6,775,747 | B2 | * | 8/2004 | Venkatraman | 711/137 |
| 6,810,466 | B2 |   | 10/2004 | Henry et al. | |
| 6,820,173 | B1 | * | 11/2004 | Bittel et al. | 711/137 |
| 6,832,296 | B2 | * | 12/2004 | Hooker | 711/137 |
| 6,981,099 | B2 | * | 12/2005 | Paulraj et al. | 711/137 |
| 7,080,211 | B2 |   | 7/2006 | Hooker | |
| 7,089,368 | B2 |   | 8/2006 | Hooker | |
| 7,627,740 | B2 | * | 12/2009 | Yasue et al. | 712/207 |
| 7,707,359 | B2 | * | 4/2010 | Mesard et al. | 711/137 |
| 2003/0079089 | A1 | * | 4/2003 | Barrick et al. | 711/137 |
| 2006/0224860 | A1 | * | 10/2006 | Colavin et al. | 712/207 |
| 2007/0271407 | A1 | * | 11/2007 | Yap et al. | 710/315 |
| 2008/0216073 | A1 | * | 9/2008 | Yates et al. | 718/100 |
| 2011/0185155 | A1 |   | 7/2011 | Henry et al. | |

* cited by examiner

*Primary Examiner* — Eric Coleman
(74) *Attorney, Agent, or Firm* — E. Alan Davis; James W. Huffman

(57) ABSTRACT

A microprocessor includes a cache memory, an instruction set having first and second prefetch instructions each configured to instruct the microprocessor to prefetch a cache line of data from a system memory into the cache memory, and a memory subsystem configured to execute the first and second prefetch instructions. For the first prefetch instruction the memory subsystem is configured to forego prefetching the cache line of data from the system memory into the cache memory in response to a predetermined set of conditions. For the second prefetch instruction the memory subsystem is configured to complete prefetching the cache line of data from the system memory into the cache memory in response to the predetermined set of conditions.

29 Claims, 3 Drawing Sheets

| CONDITION | MEMORY SUBSYSTEM TREATMENT OF GPREFETCH |
|---|---|
| UNCACHEABLE TRAIT | CAUSE EXCEPTION |
| FILL QUEUE FULL | REPLAY |
| COLLISION WITH STORE OR SNOOP | REPLAY |
| SERIALIZATION SITUATION | REPLAY |
| TLB MISS | CAUSE EXCEPTION |

FIG. 3

EXAMPLE MICROCODE SEQUENCE USING GPREFETCHES TO PERFORM PORTION OF A REP MOVS

⎯142

```
// PRIME THE PUMP WITH GPREFETCHES OF FIRST 5 CACHE LINES
GPREFETCH PREFETCH_ADDRESS
GPREFETCH PREFETCH_ADDRESS
GPREFETCH PREFETCH_ADDRESS
GPREFETCH PREFETCH_ADDRESS
GPREFETCH PREFETCH_ADDRESS

...

// START GPREFETCH-LOAD-STORE TRIPLET LOOP BODY
LOOP:
    GPREFETCH PREFETCH_ADDRESS
    LOAD LOAD_ADDRESS
    STORE STORE_ADDRESS
    IF (MORE CACHE LINES LEFT TO MOVE) GO TO LOOP

...

// THE LAST 5 CACHE LINES ARE ALREADY PREFETCHED, SO REVERT TO LOAD-STORE PAIRS
LOAD LOAD_ADDRESS
STORE STORE_ADDRESS
LOAD LOAD_ADDRESS
STORE STORE_ADDRESS
LOAD LOAD_ADDRESS
STORE STORE_ADDRESS
LOAD LOAD_ADDRESS
STORE STORE_ADDRESS
LOAD LOAD_ADDRESS
STORE STORE_ADDRESS
```

GUARANTEED PREFETCH INSTRUCTION

CROSS REFERENCE TO RELATED APPLICATION(S)

This application claims priority based on U.S. Provisional Application Ser. No. 61/182,799, filed Jun. 1, 2009, entitled GUARANTEED PREFETCH INSTRUCTION FOR USE BY FAST REPEAT STRING MOVE MICROCODE, which is hereby incorporated by reference in its entirety.

This application is related to U.S. Non-Provisional Application 12/942,440, entitled MICROPROCESSOR THAT PERFORMS FAST REPEAT STRING LOADS, which is filed concurrently herewith, and which is hereby incorporated by reference in its entirety.

FIELD OF THE INVENTION

The present invention relates in general to the field of data prefetching in microprocessors, and particularly to prefetch instructions therein.

BACKGROUND OF THE INVENTION

A relatively frequently executed x86 instruction set architecture instruction is a REP MOVS. This instruction instructs the microprocessor to move a string of data from a source location in memory to a destination location in memory. This instruction has been implemented in microcode. If the number of bytes to be moved is relatively large, the microcode employs a "fast string move" microcode routine to implement the instruction. The fast string move code performs a series of load-store micro-op pairs. The fast string move code attempts to perform large loads and stores (e.g., 16 bytes) since they are more efficient, i.e., loads and stores that are larger than the size of each data element specified by the REP MOVS[B/W/D/Q] (i.e., byte, word, double-word, quad-word).

However, the fact that the loads typically miss in the cache makes the REP MOVS relatively slow because the system memory accesses to read the cache lines specified by the loads have a long latency.

BRIEF SUMMARY OF INVENTION

In one aspect the present invention provides a microprocessor. The microprocessor includes a cache memory, an instruction set having first and second prefetch instructions each configured to instruct the microprocessor to prefetch a cache line of data from a system memory into the cache memory, and a memory subsystem configured to execute the first and second prefetch instructions. For the first prefetch instruction the memory subsystem is configured to forego prefetching the cache line of data from the system memory into the cache memory in response to a predetermined set of conditions. For the second prefetch instruction the memory subsystem is configured to complete prefetching the cache line of data from the system memory into the cache memory in response to the predetermined set of conditions. For the first prefetch instruction the memory subsystem is configured to forego prefetching the cache line of data from the system memory into the cache memory in response to a second predetermined set of conditions. For the second prefetch instruction the memory subsystem is configured to cause an exception in response to the second predetermined conditions.

In another aspect, the present invention provides a microprocessor. The microprocessor includes a cache memory and microcode configured to implement an architectural repeat string move instruction. The microcode includes a series of guaranteed prefetch-load-store instruction triplets. The microprocessor also includes a memory subsystem configured to execute the guaranteed prefetch, load, and store instructions and to prefetch into the cache memory cache lines specified by the guaranteed prefetch instructions even in the presence of a predetermined set of conditions in the presence of which the memory subsystem only treats non-guaranteed prefetch instructions as a hint.

In yet another aspect, the present invention provides a microprocessor. The microprocessor includes a cache memory and microcode configured to implement an architectural repeat string move instruction. The microcode includes a plurality of load and store instructions to move the string from a source memory location to a destination memory location. The microcode further includes a plurality of prefetch instructions sufficiently preceding the plurality of load instructions to increase the likelihood of cache lines being present in the cache memory prior to their access by the plurality of load instructions. The microprocessor also includes a memory subsystem configured to execute the prefetch, load, and store instructions, wherein the memory subsystem is configured to detect a condition that one of the plurality of prefetch instructions is specifying a memory address that misses in a translation lookaside buffer (TLB) of the microprocessor and to responsively cause the microcode to be notified of the TLB miss. The memory subsystem is configured to detect a condition that one of the plurality of prefetch instructions is specifying a memory address of a memory region having an uncacheable trait and to responsively cause th the microcode to be notified thereof. The microcode is configured to responsively move a remaining portion of the string without using prefetch instructions.

In yet another aspect, the present invention provides a method to be performed by a microprocessor having a cache memory and an instruction set having first and second prefetch instructions. The method includes detecting the presence of one or more of a predetermined set of conditions while executing an instance of the first prefetch instruction. The first prefetch instruction instructs the microprocessor to prefetch a first cache line of data from a system memory into the cache memory. The method also includes foregoing prefetching the first cache line of data from the system memory into the cache memory, in response to the detecting the presence of one or more of a predetermined set of conditions while executing an instance of the first prefetch instruction. The method also includes detecting the presence of one or more of the predetermined set of conditions while executing an instance of the second prefetch instruction. The second prefetch instruction instructs the microprocessor to prefetch a second cache line of data from the system memory into the cache memory. The method also includes completing prefetching the second cache line of data from the system memory into the cache memory, in response to the detecting the presence of one or more of the predetermined set of conditions while executing the instance of the second prefetch instruction. The predetermined set of conditions comprises a miss of an address of the first and second cache lines specified, by the first and second prefetch instructions, respectively, in a translation lookaside buffer of the microprocessor.

In yet another aspect, the present invention provides a method to be performed by a microprocessor having a cache memory. The method includes decoding an architectural repeat string move instruction. The method also includes executing a series of guaranteed prefetch-load-store instruction triplets, in response to the decoding the architectural repeat string move instruction. The executing the series of guaranteed prefetch instructions comprises prefetching into the cache memory cache lines specified by the guaranteed prefetch instructions even in the presence of a predetermined set of conditions in the presence of which the microprocessor only treats non-guaranteed prefetch instructions as a hint.

In yet another aspect, the present invention provides a method to be performed by a microprocessor having a cache memory and microcode. The method includes decoding an architectural repeat string move instruction. The method also includes executing a plurality of load and store instructions to move the string from a source memory location to a destination memory location, in response to the decoding the architectural repeat string move instruction.

The method also includes executing a plurality of prefetch instructions sufficiently prior to the executing the plurality of load instructions to increase the likelihood of cache lines being present in the cache memory prior to their access by the plurality of load instructions. The plurality of load and store instructions and the plurality of prefetch instructions are instructions of the microcode of the microprocessor. The method also includes detecting a condition that one of the plurality of prefetch instructions is specifying a memory address that misses in a translation lookaside buffer (TLB) of the microprocessor and responsively causing the microcode to be notified of the TLB miss. The method also includes flushing each of the plurality of load and store instructions newer than the one of the plurality of prefetch instructions in response to detecting the condition. The method also includes resuming, after the flushing, executing a remainder of the plurality of prefetch instructions sufficiently preceding a remainder of the plurality of load instructions to increase the likelihood of a remainder of the cache lines being present in the cache memory prior to their access by the remainder of the plurality of load instructions.

In one aspect the present invention provides a microprocessor. The microprocessor includes a cache memory, an instruction set having first and second prefetch instructions each configured to instruct the microprocessor to prefetch a cache line of data from a system memory into the cache memory, and a memory subsystem configured to execute the first and second prefetch instructions. For the first prefetch instruction the memory subsystem is configured to forego prefetching the cache line of data from the system memory into the cache memory in response to a predetermined set of conditions. For the second prefetch instruction the memory subsystem is configured to complete prefetching the cache line of data from the system memory into the cache memory in response to the predetermined set of conditions. The predetermined set of conditions comprises a condition in which the first and second prefetch instruction is behind a serializing instruction.

BRIEF DESCRIPTION OF THE DRAWINGS

FIG. 3 is a listing of an example sequence of a portion of the fast string move microcode of the microprocessor of FIG. 1.

DETAILED DESCRIPTION OF THE INVENTION

Figure 1:
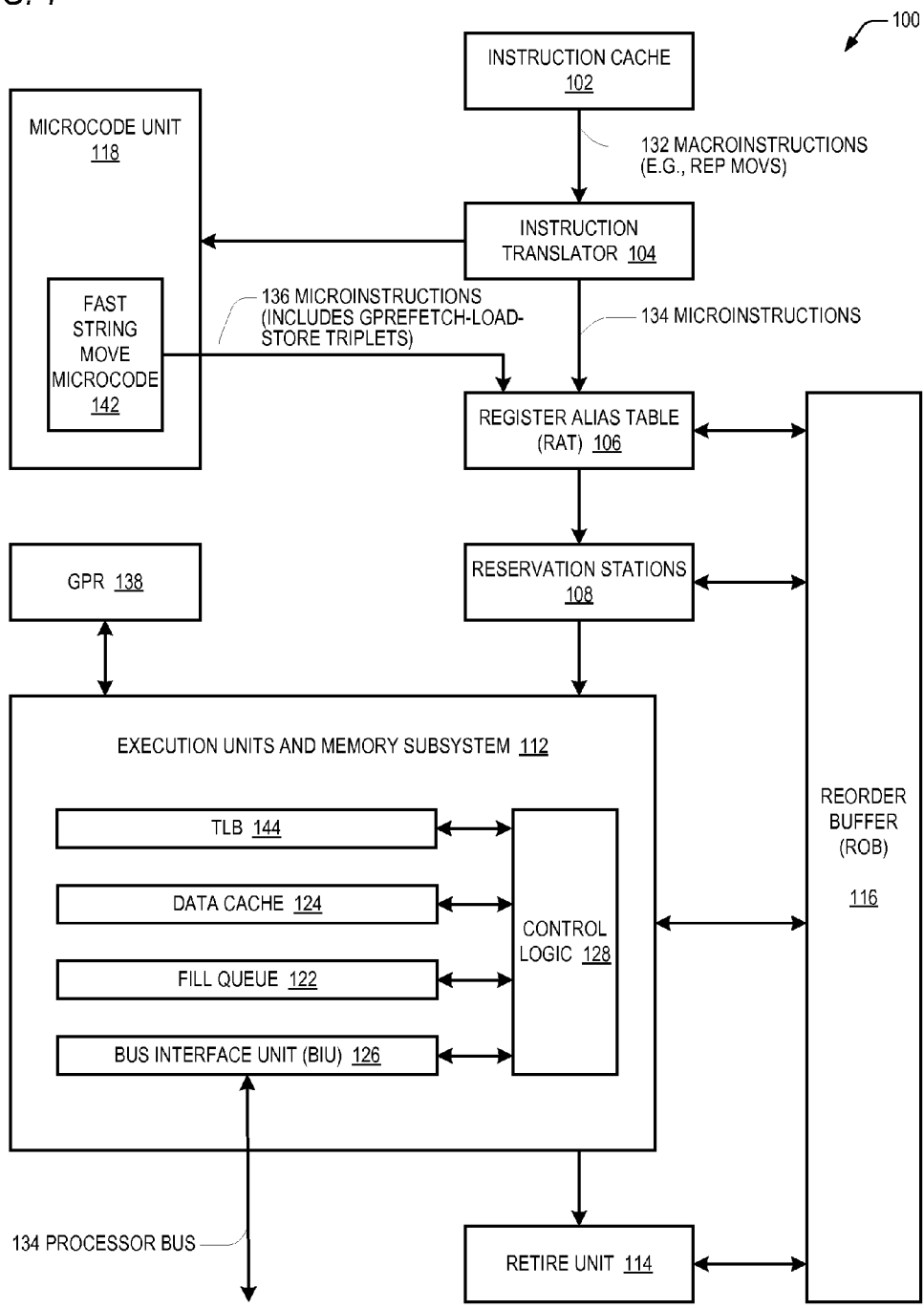
FIG. 1 is a block diagram illustrating a microprocessor according to the present invention.

The present inventors recognized that the microprocessor 100 (of FIG. 1) could perform string moves faster if it could somehow get the loads to hit in the data cache 124 (of FIG. 1). The present inventors attempted to do this by hiding the memory access latency associated with the load operations by including in the microcode prefetch instructions that prefetch the soon-to-be-needed portion of the string into the cache 124 ahead of the loads. However, they noted that the memory subsystem treats normal prefetch operations only as a hint. That is, the memory subsystem foregoes fetching the cache line into the data cache 124 under some conditions, such as when the fill queue 122 (of FIG. 1) is full (i.e., all entries currently allocated), a tablewalk is required, a serialization situation (e.g., the prefetch is behind a serializing instruction, such as a locked operation) is encountered, or the prefetch address-collides with a store or snoop. When one of these conditions occurs, the specified cache line is not prefetched into the cache, which typically causes the loads to start missing in the cache, causing the string moves to be slow again.

Recognizing that the microprocessor 100 knows it really needs to prefetch the data into the cache 124, the present inventors added a guaranteed prefetch (gprefetch) microinstruction to the microinstruction set that the fast string move microcode 142 (of FIG. 1) can use. Gprefetch is different from a normal prefetch in that it guarantees it will fetch the specified cache line into the data cache 124 in almost any condition permitted by the architecture.

Figures 2, 4:
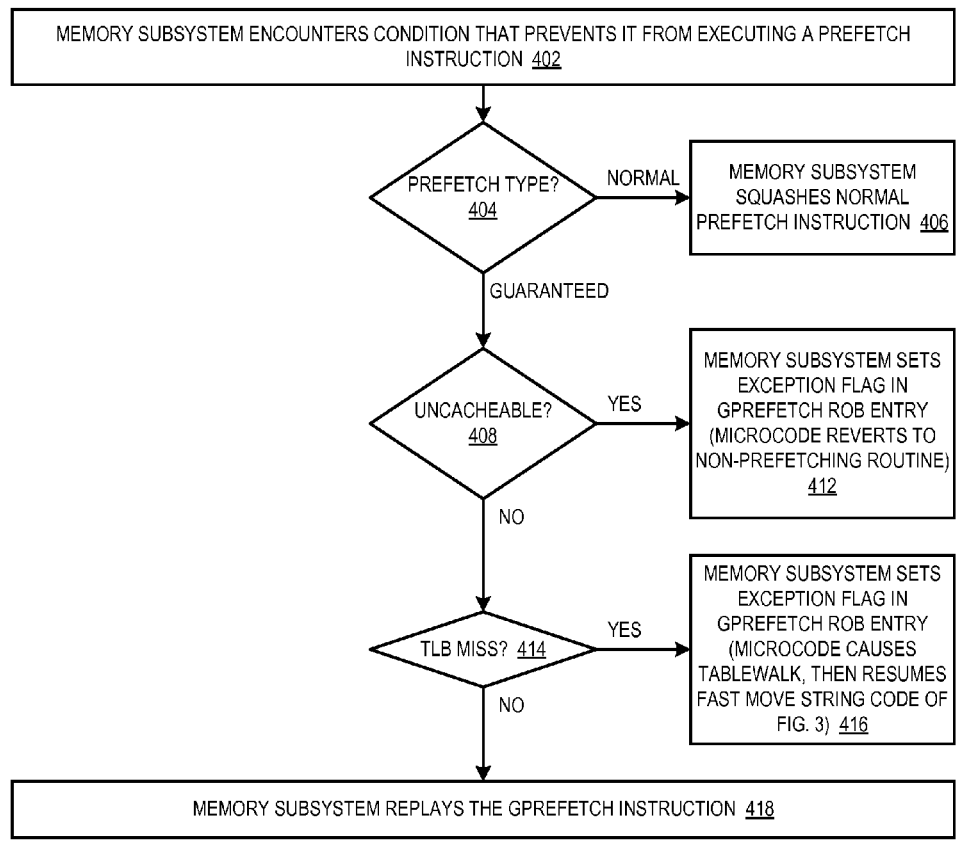
FIG. 2 is a table that lists the action performed by the memory subsystem of the microprocessor of FIG. 1 when executing a gprefetch instruction under various circumstances.
FIG. 4 is a flowchart illustrating operation of the microprocessor of FIG. 1.

The table shown in FIG. 2 lists the action performed by the memory subsystem 112 (of FIG. 1) when executing a gprefetch instruction under various circumstances.

(1) If the memory trait of the page being addressed by the gprefetch is an uncacheable trait, then the memory subsystem 112 does not prefetch the cache line, since the architecture does not permit it, but instead causes the gprefetch instruction to generate an exception so that the microcode can perform the string move in a normal, i.e., non-prefetching, fashion.

(2) If the fill queue 122 is full, the memory subsystem 112 will cause the gprefetch to be replayed until it successfully allocates a fill queue 122 entry.

(3) If the gprefetch collides with a store or snoop, the memory subsystem 112 will cause the gprefetch to be replayed until it no longer collides.

(4) If the memory subsystem 112 encounters a serialization situation, it will replay the gprefetch.

(5) If the gprefetch virtual address misses in the TLB 144 (of FIG. 1), the memory subsystem 112 does not prefetch the cache line and will cause the gprefetch instruction to generate an exception. By generating an exception that is handled by the microcode, the memory subsystem 112 enables the fast string move microcode to re-prime the pump after causing the memory subsystem 112 to perform the tablewalk. Otherwise, particularly if the TLB 144 miss occurred in the loop body of gprefetch-load-store triplets (see FIG. 3 and discussion below), it is possible that the latency of the memory access associated with the gprefetch will not be hidden such that the corresponding load will miss in the cache; however, the exception causes any microinstructions in the pipeline newer than the gprefetch, including the gprefetch-load-store triplets, to be flushed. Typically, the re-priming of the pump is not necessary in the case of a full fill queue 122 condition, store/snoop collision, or serialization situation; therefore, the memory subsystem 112 does not cause an exception under those conditions, but instead replays the gprefetch instruction. In an alternate embodiment, the memory subsystem 112 performs the tablewalk and replays the gprefetch instruction in response to the TLB 144 miss.

As shown in FIG. 3, the fast string move microcode 142 is modified to add a gprefetch to the load-store pairs to create gprefetch-load-store triplets in order to prefetch the data into the data cache before the load executes. Because the gprefetch typically involves a relatively long system memory access latency, the microcode 142 includes a few gprefetches (five in the embodiment of FIG. 3) to "prime the pump" before it begins the gprefetch-load-store triplets. The microcode 142 programmer attempts to place the gprefetches sufficiently temporally ahead of the gprefetch-load-store triplet loop body such that the cache lines specified by the initial gprefetches have made it into the data cache 124 by the time the loads arrive at the memory subsystem 112 such that the loads hit in the data cache 124. That is, the microcode 142 programmer attempts to place enough other instructions between the initial gprefetches and the gprefetch-load-store triplet loop body such that the initial gprefetch cache lines are in the data cache 124 by the time the loads arrive. Accordingly, at the end of the loop the microcode 142 includes a corresponding few (e.g., five) load-store pair sets (i.e., without gprefetches) to sync up with the few initial pump-priming gprefetches. In one embodiment, the size of a cache line is 64 bytes and the size of each load/store is 16 bytes. Thus, although the example code sequence in FIG. 3 shows five load-store pairs, there are actually five sets of 64-byte load-store pairs, i.e., five sets of four 16-byte each load-store pairs. It is crucial for performance that the gprefetches stay ahead of the loads and actually read the specified cache line into the data cache 124 so that the loads hit in the cache 124. This is why it is important for the gprefetches to be guaranteed to complete, via a replay if necessary, or to at least cause an exception to give the microcode 142 a chance to re-prime the pump (such as in the case of a TLB 144 miss), and why the normal prefetches are insufficient because they are treated only as hints. In one embodiment, each of the gprefetch, load, and store operations updates (i.e., increments) its respective prefetch_address, load_address, and store_address.

Referring now to FIG. 1, a block diagram illustrating a microprocessor 100 according to the present invention is shown. The microprocessor 100 is a pipelined microprocessor that includes an instruction cache 102 that caches program instructions, also referred to herein as macroinstructions 132. The instruction cache 102 provides the macroinstructions 132 to an instruction translator 104. The instruction translator 104 decodes each macroinstruction 132 and translates most macroinstructions 132 into one or more microinstructions 134. The translated microinstructions 134 may include a normal prefetch instruction, as described above, among others. Furthermore, as mentioned below, in one embodiment the instruction set architecture of the microprocessor 100 includes a gprefetch macroinstruction 132 that may be included in user programs. The instruction translator 104 is configured to know that some of the macroinstructions 132 are implemented in microcode 142 of a microcode unit 118 of the microprocessor 100. When the instruction translator 104 encounters a macroinstruction 132 that is implemented in microcode 142, the instruction translator 104 transfers control to a microsequencer (not shown) of the microcode unit 118, which fetches microinstructions 136 of the microcode 142 from a microcode memory (not shown) of the microcode unit 118 and dispatches the microinstructions 136 for execution. In particular, the microcode 142 includes code (referred to herein as fast string move microcode 142) for implementing a repeat string move macroinstruction 132, such as an x86 architecture REP MOVS instruction, using gprefetch microinstructions. The microinstructions 136 may include load, store, and gprefetch microinstructions, among others.

A register alias table (RAT) 106 receives both the translated microinstructions 134 from the instruction translator 104 and the microcode 142 microinstructions 136 from the microcode unit 118 and generates dependencies of the microinstructions 134/136. In one embodiment, the microprocessor 100 is an out-of-order execution microprocessor, and the RAT 106 is the last portion of the microprocessor 100 pipeline that receives instructions in program order. The RAT 106 incorporates the program order of the instructions, which is used by a reorder buffer (ROB) 116 to retire the instructions 134/136 in program order. The RAT 106 allocates an entry in the ROB 116 for each instruction 134/136 in program order before dispatching it to the reservation stations 108. The ROB 116 is coupled to the RAT 106, the reservation stations 108, execution units and memory subsystem 112, and a retire unit 114.

The reservation stations 108 receive microinstructions 134/136 from the RAT 106 and issue the microinstructions 134/136 to the execution units 112 as their source operands become available based on the dependency information generated by the RAT 106 and as the execution units 112 become available. The microprocessor 100 also includes general purpose registers 138, which are used by microinstructions 134/136 as intermediate storage locations for string data being moved by the fast string move microcode 142. The retire unit 114 retires microinstructions 134/136 in program order as identified by their order in the ROB 116. In particular, the retire unit 114 examines flags in the entry of the oldest instruction in the ROB 116 to determine whether the instruction 134/136 needs to be replayed or whether an exception needs to be raised.

The memory subsystem 112 includes a translation lookaside buffer (TLB) 144, a data cache 124, a fill queue 122, a bus interface unit (BIU) 114, and control logic 128 coupled to control the TLB 144, data ache 124, fill queue 122, and bus interface unit 114. The bus interface unit 114 interfaces the microprocessor 100 to a processor bus that is coupled to the system memory (not shown) of the computer system in which the microprocessor 100 resides. The system memory, among other things, stores a string of data to be moved by a repeat string move instruction 132 from a source address to a destination address specified by the repeat move string instruction 132. The TLB 144 caches virtual to physical address translations for memory pages. The data cache 124 caches data read from the system memory, such as string data of a repeat move string instruction. The fill queue 122 has a finite number of cache line buffers, each separately allocatable by the memory subsystem 112 for receiving a cache line read from system memory by the bus interface unit 114, such as a cache line of string data specified by a repeat move string instruction that is prefetched by a gprefetch instruction. Because the gprefetch instruction does not load data into an architectural register of the microprocessor 100, advantageously the memory subsystem 112 completes the gprefetch instruction, thereby freeing up resources in the memory subsystem, once it determines that none of the conditions exist that would prevent it from fetching the cache line specified by the gprefetch instruction (as discussed with respect to block 402 of FIG. 4) and allocates a fill queue 122 cache line buffer for the cache line. Furthermore, the retire unit 114 retires the gprefetch instruction as soon as it is the oldest instruction in the microprocessor 100, which advantageously frees up the entry in the ROB 116 that was previously allocated to the gprefetch instruction.

The memory subsystem 112 executes gprefetch instructions, normal prefetch instructions, load instructions, and store instructions, among others. In some situations, the memory subsystem 112 may want to cause the microprocessor 100 to replay an instruction, such as a gprefetch instruction, or to cause the microprocessor 100 to raise an exception in response to an instruction, such as a gprefetch instruction, as shown in the table of FIG. 2. To accomplish a replay, the memory subsystem 112 sets a flag in the gprefetch's ROB 116 entry to indicate that the gprefetch must be replayed. Subsequently, when the gprefetch is ready to retire (i.e., is the oldest instruction in the ROB 116), the ROB 116 replays the gprefetch and all instructions newer than it back to the reservation stations 108 such that their source operands are re-fetched and they are re-issued to the execution units and memory subsystem 112 for execution. To accomplish an exception, the memory subsystem 112 sets a flag in the gprefetch's ROB entry to indicate that the gprefetch caused an exception condition. Subsequently, when the gprefetch is ready to retire, the ROB 116 raises an exception, which is handled by an exception handler in the microcode, which communicates the exception condition to the fast string move microcode 142.

Referring now to FIG. 4, a flowchart illustrating operation of the microprocessor 100 of FIG. 1 according to the present invention is shown. Flow begins at block 402.

At block 402, the memory subsystem 112 is executing a prefetch instruction (i.e., either a gprefetch or a normal prefetch) and encounters a condition, such as the conditions shown in the table of FIG. 2, which prevents it from reading the specified cache line into the data cache 124. Flow proceeds to decision block 404.

At decision block 404, the memory subsystem 112 determines the type of the prefetch instruction. If the prefetch instruction is a gprefetch, flow proceeds to decision block 408; whereas, if the prefetch instruction is a normal prefetch instruction, flow proceeds to block 406.

At block 406, the memory subsystem 112 squashes the normal prefetch instruction. That is, the memory subsystem 112 does not generate a transaction on the processor bus 134 to read the cache line specified by the normal prefetch instruction and allows the normal prefetch instruction to retire normally. In other words, the memory subsystem 112 treats the normal prefetch instruction as a hint, and executes it as a no-op in the presence of the condition. In one embodiment, in the case of a TLB 144 miss of the address of a cache line specified by a normal prefetch instruction, the memory subsystem 112 performs a tablewalk and then replays the normal prefetch instruction, rather than squashing it. Flow ends at block 406.

At decision block 408, the memory subsystem 112 determines whether the condition encountered at block 402 is that the gprefetch specified an address in a memory region with an uncacheable memory trait. If so, flow proceeds to block 412; otherwise, flow proceeds to decision block 414.

At block 412, the memory subsystem 112 foregoes prefetching the cache line and sets the exception flag within the ROB 116 entry of the gprefetch instruction to cause the gprefetch instruction to subsequently raise an exception. This enables the microcode 142 to resort to a non-prefetching version of code to implement the repeat move string instruction. It is noted that the exception raised by setting the exception flag within the ROB 116 entry at blocks 412 and 416 is not an architectural exception, but rather a micro-exception internal to the microprocessor 100. That is, the microcode does not transfer control to system software as it does in the case of an architectural exception. Flow ends at block 412.

At decision block 414, the memory subsystem 112 determines whether the condition encountered at block 402 is that the gprefetch specified an address that missed in the TLB 144. If so, flow proceeds to block 416; otherwise, flow proceeds to block 418.

At block 416, the memory subsystem 112 foregoes prefetching the cache line and sets the exception flag within the ROB 116 entry of the gprefetch instruction to cause the gprefetch instruction to subsequently raise an exception. The exception causes any microinstructions 136 in the microprocessor 100 pipeline newer than the gprefetch to be flushed, including the gprefetch-load-store triplets of FIG. 3. Subsequently, the fast string move microcode 142 executes an instruction that causes the tablewalk to be performed to obtain the virtual to physical page translation of the memory page that includes the cache line address specified by the gprefetch instruction. Furthermore, advantageously, the fast string move microcode 142 of FIG. 3 resumes, which re-primes the pump and performs the fast string move using gprefetches. In an alternate embodiment, the memory subsystem 112 performs the tablewalk in response to the TLB miss and then replays the gprefetch instruction similar to the manner described with respect to block 418, rather than causing it to generate an exception. Flow ends at block 416.

At block 418, the memory subsystem 112 sets the replay flag within the ROB 116 entry of the gprefetch instruction to cause the gprefetch instruction to subsequently be replayed. In many cases, when the gprefetch instruction is replayed the condition will no longer exist (i.e., a fill queue 122 entry will be available; the address collision will no longer exist; or the serializing instruction will have retired) such that the memory subsystem 112 can immediately execute the gprefetch instruction on the replay in time for the cache line to be present in the data cache 124 when the corresponding load instruction reaches the memory subsystem 112. Flow ends at block 418.

Although the embodiments described herein do not require it, embodiments are contemplated which add a gprefetch instruction to the instruction set architecture of the microprocessor 100 for use by user programs similar to the gprefetch microinstruction used by the fast string move microcode 142.

An advantage of adding a gprefetch microinstruction to the microinstruction set is that the microcode may perform the REP MOVS instructions faster since the data being moved is much more likely to hit in the data cache 124 when the loads execute.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
    a cache memory;
    an instruction set having first and second prefetch instructions, each configured to instruct the microprocessor to prefetch a cache line of data from a system memory into the cache memory; and
    a memory subsystem, configured to execute the first and second prefetch instructions, wherein for the first prefetch instruction the memory subsystem is configured to forego prefetching the cache line of data from the system memory into the cache memory in response to a predetermined set of conditions, wherein for the second prefetch instruction the memory subsystem is configured to complete prefetching the cache line of data from the system memory into the cache memory in response to the predetermined set of conditions;
    wherein for the first prefetch instruction the memory subsystem is configured to forego prefetching the cache line of data from the system memory into the cache memory in response to a second predetermined set of conditions, wherein for the second prefetch instruction the memory subsystem is configured to cause an exception in response to the second predetermined set of conditions.

2. The microprocessor as recited in claim 1, wherein the instruction set is an architectural instruction set.

3. The microprocessor as recited in claim 2, wherein the architectural instruction set is an x86 architecture instruction set.

4. The microprocessor as recited in claim 1, wherein the instruction set is a microarchitectural instruction set.

5. The microprocessor as recited in claim 1, wherein for the second prefetch instruction the memory subsystem is configured to complete prefetching the cache line of data from the system memory into the cache memory in response to the predetermined set of conditions by replaying the second prefetch instruction.

6. The microprocessor as recited in claim 1, wherein the predetermined set of conditions comprises a fill queue of the microprocessor being full, wherein the full queue has a predetermined number of storage elements configured to receive cache lines from the system memory.

7. The microprocessor as recited in claim 1, wherein the predetermined set of conditions comprises a collision of an address of the cache line specified by the first and second prefetch instruction with an older store instruction pending in the microprocessor.

8. The microprocessor as recited in claim 1, wherein the predetermined set of conditions comprises a collision of an address of the cache line specified by the first and second prefetch instruction with a snoop operation pending in the microprocessor.

9. The microprocessor as recited in claim 1, wherein the predetermined set of conditions comprises a condition in which the first and second prefetch instruction is behind a serializing instruction.

10. The microprocessor as recited in claim 1, wherein the predetermined set of conditions comprises a miss of an address of the cache line specified by the first and second prefetch instruction in a translation lookaside buffer of the microprocessor.

11. The microprocessor as recited in claim 1, wherein the second predetermined set of conditions comprises a memory trait of a memory page addressed by the first and second prefetch instruction is uncacheable.

12. The microprocessor as recited in claim 1, wherein the second predetermined set of conditions comprises a miss of an address of the cache line specified by the first and second prefetch instruction in a translation lookaside buffer of the microprocessor.

13. The microprocessor as recited in claim 12, wherein the memory subsystem is configured to perform a page tablewalk to obtain a virtual to physical translation of the address of the cache line specified by the second prefetch instruction.

14. The microprocessor as recited in claim 12, wherein microcode of the microprocessor is configured to cause the memory subsystem to perform a page tablewalk to obtain a virtual to physical translation of the address of the cache line specified by the second prefetch instruction.

15. The microprocessor as recited in claim 1, further comprising:
    microcode, comprising an exception handler configured to handle the exception and configured to communicate with repeat string move microcode of the microprocessor, wherein the repeat string move microcode is configured to implement a repeat string move instruction of the instruction set architecture of the microprocessor.

16. The microprocessor as recited in claim 15, wherein the repeat string move instruction of the instruction set architecture of the microprocessor comprises an x86 instruction set architecture REP MOVS instruction.

17. A microprocessor, comprising:
    a cache memory;
    microcode, configured to implement an architectural repeat string move instruction, the microcode including a series of guaranteed prefetch-load-store instruction triplets; and
    a memory subsystem, configured to execute the guaranteed prefetch, load, and store instructions and to prefetch into the cache memory cache lines specified by the guaranteed prefetch instructions even in the presence of a predetermined set of conditions in the presence of which the memory subsystem only treats non-guaranteed prefetch instructions as a hint.

18. The microprocessor as recited in claim 17, wherein the architectural repeat string move instruction comprises an x86 instruction set architecture REP MOVS instruction.

19. The microprocessor as recited in claim 17, wherein the microcode includes one or more guaranteed prefetch instructions executed by the memory subsystem before the series of guaranteed prefetch-load-store instruction triplets such that the one or more guaranteed prefetch instructions will read cache lines specified thereby into the cache memory before the memory subsystem encounters the load instructions of the guaranteed prefetch-load-store instruction triplets.

20. A microprocessor, comprising:
    a cache memory;
    microcode, configured to implement an architectural repeat string move instruction, the microcode including a plurality of load and store instructions to move the string from a source memory location to a destination memory location, the microcode further including a plurality of prefetch instructions sufficiently preceding the plurality of load instructions to increase the likelihood of cache lines being present in the cache memory prior to their access by the plurality of load instructions; and a memory subsystem, configured to execute the prefetch, load, and store instructions, wherein the memory subsystem is configured to detect a condition that one of the plurality of prefetch instructions is specifying a memory address that misses in a translation lookaside buffer (TLB) of the microprocessor and to responsively cause the microcode to be notified of the TLB miss;

wherein the memory subsystem is configured to detect a condition that one of the plurality of prefetch instructions is specifying a memory address of a memory region having an uncacheable trait and to responsively cause the microcode to be notified thereof, wherein the microcode is configured to responsively move a remaining portion of the string without using prefetch instructions.

21. The microprocessor as recited in claim 20, wherein the microprocessor is configured to flush each of the plurality of load and store instructions newer than the one of the plurality of prefetch instructions in response to detecting the condition.

22. The microprocessor as recited in claim 21, wherein after the flushing, the microcode is configured to resume performing a remainder of the plurality of prefetch instructions sufficiently preceding a remainder of the plurality of load instructions to increase the likelihood of a remainder of the cache lines being present in the cache memory prior to their access by the remainder of the plurality of load instructions.

23. A method to be performed by a microprocessor having a cache memory and an instruction set having first and second prefetch instructions, the method comprising:
    detecting the presence of one or more of a predetermined set of conditions while executing an instance of the first prefetch instruction, wherein the first prefetch instruction instructs the microprocessor to prefetch a first cache line of data from a system memory into the cache memory;
    foregoing prefetching the first cache line of data from the system memory into the cache memory, in response to said detecting the presence of one or more of a predetermined set of conditions while executing an instance of the first prefetch instruction;
    detecting the presence of one or more of the predetermined set of conditions while executing an instance of the second prefetch instruction, wherein the second prefetch instruction instructs the microprocessor to prefetch a second cache line of data from the system memory into the cache memory; and
    completing prefetching the second cache line of data from the system memory into the cache memory, in response to said detecting the presence of one or more of the predetermined set of conditions while executing the instance of the second prefetch instruction;
    wherein the predetermined set of conditions comprises a miss of an address of the first and second cache lines specified by the first and second prefetch instructions, respectively, in a translation lookaside buffer of the microprocessor.

24. The method as recited in claim 23, wherein the instruction set is an architectural instruction set.

25. The method as recited in claim 24, wherein the architectural instruction set is an X86 architecture instruction set.

26. A method to be performed by a microprocessor having a cache memory, the method comprising:
    decoding an architectural repeat string move instruction; and
    executing a series of guaranteed prefetch-load-store instruction triplets, in response to said decoding the architectural repeat string move instruction, wherein said executing the series of guaranteed prefetch instructions comprises prefetching into the cache memory cache lines specified by the guaranteed prefetch instructions even in the presence of a predetermined set of conditions in the presence of which the microprocessor only treats non-guaranteed prefetch instructions as a hint.

27. The method as recited in claim 26, wherein the architectural repeat string move instruction comprises an x86 instruction set architecture REP MOVS instruction.

28. A method to be performed by a microprocessor having a cache memory and microcode, the method comprising:
    decoding an architectural repeat string move instruction;
    executing a plurality of load and store instructions to move the string from a source memory location to a destination memory location, in response to said decoding the architectural repeat string move instruction;
    executing a plurality of prefetch instructions sufficiently prior to said executing the plurality of load instructions to increase the likelihood of cache lines being present in the cache memory prior to their access by the plurality of load instructions, wherein the plurality of load and store instructions and the plurality of prefetch instructions are instructions of the microcode of the microprocessor;
    detecting a condition that one of the plurality of prefetch instructions is specifying a memory address that misses in a translation lookaside buffer (TLB) of the microprocessor and responsively causing the microcode to be notified of the TLB miss;
    flushing each of the plurality of load and store instructions newer than the one of the plurality of prefetch instructions in response to detecting the condition; and
    resuming, after said flushing, executing a remainder of the plurality of prefetch instructions sufficiently preceding a remainder of the plurality of load instructions to increase the likelihood of a remainder of the cache lines being present in the cache memory prior to their access by the remainder of e plurality of load instructions.

29. A microprocessor, comprising:
    a cache memory;
    an instruction set having first and second prefetch instructions, each configured to instruct the microprocessor to prefetch a cache line of data from a system memory into the cache memory; and
    a memory subsystem, configured to execute the first and second prefetch instructions, wherein for the first prefetch instruction the memory subsystem is configured to forego prefetching the cache line of data from the system memory into the cache memory in response to a predetermined set of conditions, wherein for the second prefetch instruction the memory subsystem is configured to complete prefetching the cache line of data from the system memory into the cache memory in response to the predetermined set of conditions;
    wherein the predetermined set of conditions comprises a condition in which the first and second prefetch instruction is behind a serializing instruction.

* * * * *